Patented Dec. 3, 1946

2,411,938

UNITED STATES PATENT OFFICE 2,411,938

CLEANING AND POLISHING COMPOSITIONS

Jacob Ratner, Brooklyn, N. Y.

No Drawing. Application May 19, 1941,
Serial No. 394,225

5 Claims. (Cl. 260—19)

This invention relates to cleaning and polishing compositions particularly suitable for automobiles and all types of household furniture.

This application is a continuation-in-part of application Serial No. 76,079, filed April 23, 1936, entitled Cleaning and polishing compositions.

A very great number of different types of cleaning and polishing compositions have been used and suggested in the prior art. While such wide variety of polishes have been known, they are open to a large number of difficulties and deficiencies both from the standpoint of manufacture and in use. Many of them are expensive to make. Many are inflammable and give rise to hazardous conditions in both manufacture and use. Many of them require heat during processing and manufacture. Many of them while useful on one type of surface, injure other types of surfaces so that they are not capable of general application. Many of them are not homogeneous resulting in segregation of components on standing which cannot be readily made compatible even by violent shaking. Many of them require rubbing or buffing in order to develop the luster required. Many of them give rise to a surface bloom. Many of them do not dry rapidly enough and are not resistant to finger marks. Many of them are subject to spotting by water or rain.

Among the objects of the present invention is the production of cleaning and polishing compositions generally applicable on coatings containing a vegetable oil or even on cellulose ester coatings normally susceptible to injury when treated with a polish containing substantial amounts (as over 33%) of cellulose ester solvents, as in connection with automobiles and household furniture, which compositions are economical to manufacture, may be produced from components readily available, and have unique properties eliminating the difficulties and deficiencies of prior art compositions.

Many other and further objections and advantages will appear from the more detailed description given below, it being understood, however, that this more detailed description is given by way of illustration and explanation only, and not by way of limitation, since various changes therein, may be made by those skilled in the art, without departing from the scope and spirit of the present invention.

In accordance with the present invention, cleaning and polishing compositions are produced which deposit on the treated surface a very thin, delicate, invisible, transparent preservative film which dries rapidly, is lustrous in and of itself without the need of buffing or rubbing, is readily applied in uniform manner by mere wiping on as with a cloth, is resistant to dust, finger marks, water spotting, etc., and is of substantial durability, is freely and readily distributable over a large area of surface and does not lead to undesirable accumulations even after frequent applications, and permits the composition to contain high percentages as much as 85 to 92% of a petroleum diluting cleaning vehicle without causing bloom on the treated surface.

In such compositions in accordance with the present invention, a film-forming component is employed but the proportions of such film-forming component are such as not to produce an ordinary substantial resinous or lacquer type coating which could not be applied with a cloth and would not be suitable for frequently repeated applications. Of the film-forming components available in the art, there are two outstanding materials of unique value in cleaning and polishing compositions produced in accordance with the present invention, those outstanding film-forming components being phenol formaldehyde resins on the one hand, and substantially pure metallic organic compounds illustrated by the heavy metal derivatives of fatty acids, particularly those from the glyceride oils, namely, linoleates, oleates and stearates, and also those produced from resinic acid which may be called resinates and from naphthenic acid as well as the metal butyl phthalates. These film-forming components may be utilized individually or in combination, and particularly important results are obtained by employing combinations of the phenol formaldehyde resins with the metallic organic compound as will be further illustrated below.

Of the phenol formaldehyde resins, a most important one for present purposes are the oil soluble phenol formaldehyde resins readily available today and produced generally from substituted alkyl phenols. Such oil soluble phenol formaldehyde resins may be utilized to produce homogeneous compositions by the utilization of the vehicles and modifying liquids of the present invention. The alcohol soluble phenol formaldehyde resins and polybasic acid-polyhydric alcohol resins may also be employed. In coating compositions such resins require the use of not less than 40% of a cellulose ester solvent and such compositions containing those proportions of cellulose ester solvent would be injurious if applied as a cleaner or polisher for surfaces carrying cellulose ester coatings. In accordance with the present invention such resins are used in a much smaller quantity, and by employing a mild modifying liquid, i. e., an oil containing ester or a chlorinated or aromatic hydrocarbon, as an auxiliary solvent, the quantity of cellulose ester solvent can be kept to about 25% of the composition, thus facilitating the use of these resins in cleaning and polishing compositions.

In producing the polishing and cleaning compositions of the present invention the desired film-forming component is utilized in a composition which contains a relatively major amount even up to 80 or 85% and more of the composition, of a mild or neutral diluting cleaning vehicle and generally also there is present in the composition, a substantially lesser proportion of a modifying liquid particularly useful in combining and homogenizing the resin with a diluting cleaning vehicle consisting of a petroleum derivative which when used alone (without the modifying liquid) tends to precipitate or to settle out even an oil soluble phenol resin and to produce bloom on a treated surface. Generally a phenol formaldehyde resin when employed is used in an amount of from 1 to 10% of the composition while the organic metallic component may be used in an amount of from 1 to 20% of the composition, and mixtures of the phenol formaldehyde resins and metallic organic components may be employed in the same composition within the limits referred to.

The mild or neutral diluting cleaning vehicle is desirably chosen from the group which consists of volatile petroleum hydrocarbons such as petroleum naphtha, Stoddard solvent, etc., which can be referred to as light petroleum liquids, volatile liquid chlorinated hydrocarbons, such as carbontetrachloride which is the most preferable and ethylene dichloride, and volatile liquid hydrocarbons, such as xylol as well as turpentine; or various mixtures and combinations of these stated components. The light petroleum component or the carbontetrachloride are the most desirable components for these compositions for general application, while the xylol and the ethylene dichloride are more effective vehicles in compositions particularly useful on varnished or painted surfaces. Turpentine may be included to reduce the high luster and to produce a semi-dull or dull film, as for example, when desired on antique furniture.

For most desirable results, the phenol formaldehyde resin is used in an amount of from 1 to 5% of the composition, together with the diluting cleaning vehicle, the latter constituting the major proportion or bulk of the composition. Where the resin is not soluble in the petroleum derivative or cleaning vehicle employed and for other purposes as well, a modifying liquid is employed, particularly in proportions of from 10 to 25%.

Such modifying liquid is desirably chosen from the following groups. Volatile liquid aromatic hydrocarbons may be used, such as benzol, toluol and xylol, and their derivatives such as benzyl benzoate, benzyl alcohol, and benzyl acetate, and also turpentine. Or a volatile liquid chlorinated hydrocarbon may be employed such as carbontetrachloride which is most suitable for use in the higher ratios. Other chlorinated hydrocarbons having a higher boiling point and which are used or usable in lacquers as solvents auxiliary to the direct alcoholic solvents, can be employed in the lower ratios, such other chlorinated hydrocarbons including ethylene dichloride, trichlorethylene, tetrachlorethylene, orthodichlorbenzene, etc.; as well as chlorhydrins like dichlorhydrin and ethylenechlorhydrin can be used. Even the lower (than carbontetrachloride) boiling methyl chlorine compounds such as methylene chloride, can be used in the polishes in a proportion of say 25% for the purpose of reducing the proportion of direct alcoholic or ester solvent or for the purpose of enabling the use of a very slowly evaporating petroleum diluent such as kerosene. Further there can be used as the modifying liquid oil containing ester such as pine oil, essential oils such as Siberian pine-needle oil or Venice turpentine, either the synthetic or natural, the natural product being pasty and slow drying being used in proportions generally of not more than about 4% compounded with from 10 to 16% of other members of the hereinmentioned groups. Or cellulose ester solvents may be used, such as alcohols, esters particularly the acetic and benzoic acid esters, glycol solvents, such as ethylene glycol, butyl cellosolve, etc., as well as solvents produced by hydrogenation such as hydrogenated phenol. Particularly important for inclusion in this group are the mobile pure organic metallic compounds, such as cobalt, lead, etc., linoleates, naphthenates, etc., particularly those which are soluble directly in petroleum and may be utilized with the oil soluble phenol formaldehyde resins in a petroleum vehicle to serve as an individual solvent (requiring the aid of no other solvent or modifying liquid) for the resin and as a modifier of the petroleum diluent by reducing the disagreeable odor and preventing surface bloom; and they may also be used as an auxiliary solvent with an alcohol soluble resin for the purpose of minimizing the proportion of cellulose ester solvent to less than 30% of the composition. These mobile organic metallic compounds also serve as a lubricity agent thus enabling the solvent for the alcohol soluble resin to be non-sirupy, non-viscous, and non-dense, such as a simple alcohol, which is most economical for use.

In connection with these various vehicles it should be noted that any of the volatile liquid chlorinated hydrocarbons are suitable for use as a modifying liquid in a ratio of from 10 to 25% of the composition; but when used as a diluting cleaning vehicle in the ratios above that amount, carbontetrachloride is the most suitable although ethylenedichloride can also be used in the higher percentages. Similarly, in connection with the coal tar aromatic hydrocarbons, all are suitable for use in a proportion of 10 to 25% but when used as a diluent, in the high ratios only xylol should be employed and then only for compositions for application to oil coatings.

Various examples may be given to illustrate compositions produced in accordance with the present invention, the first group of examples relating to compositions produced with phenol formaldehyde resins.

*Example I*

|  | Parts |
|---|---|
| Oil soluble phenol formaldehyde resin | 1 to 5 |
| A modifying liquid | 20 |
| Petroleum naphtha | 80 |

In this as in other examples set forth below the components may be mixed in any desired order unless otherwise indicated and the composition is readily produced by combination of the stated components. In order to reduce the inflammability of the compositions where the volatile petroleum diluents are employed, substantially non-inflammable compositions may be produced by utilizing carbontetrachloride, for example, in an amount equal to that of the light petroleum components. This is illustrated in the following example:

Example II

|  | Parts |
|---|---|
| Phenol formaldehyde oil soluble resin | 1 to 5 |
| Pine oil | 12 |
| Stoddard solvent | 42 |
| Carbontetrachloride | 42 |

In lieu of the pine oil a mobile pure organic metallic compound, more particularly described below, may be employed or the modifying liquid may be chosen from the ingredients given above. The Stoddard solvent and carbontetrachloride constitute the diluting cleaning vehicle.

Alcohol soluble resins of the phenol formaldehyde or polybasic acid-polyhydric alcohol type may be employed, the quantities being substantially less than that ordinarily employed for coating purposes; such compositions containing diluting vehicles including petroleum derivatives as set forth is thus made possible even by using minor proportions of a cellulose ester solvent, the amount of the latter being substantially less than that ordinarily required in producing coating compositions. The following example illustrates such combination:

Example III

|  | Parts |
|---|---|
| Alcohol soluble resin | 1 to 5 |
| Cellulose ester solvent | 24 |
| A modifying liquid as set forth above | 16 |
| Petroleum naphtha | 55 to 60 |

This composition is not injurious when used as a cleaning and polishing composition, even on quite sensitive surfaces and produces a remarkable film of the character set forth above.

Cleaning and polishing compositions of the character set forth above are particularly important and have unique properties. Immediately after any excess of applied polishing composition has been wiped off, these compositions are resistant to dust, in a relatively short time, as for example, the space of one hour, they become substantially dry and resistant to finger marks, give a high luster on automobile surfaces comparable with newly sprayed film, they are homogeneous and do not require agitation or shaking before use, and they avoid lubricity agents such as greasy non-drying oils or even vegetable drying oils and saponifiable waxes which act to reduce luster and interfere with other desirable properties in such composition necessitating the use of buffing. They do not result in any appearance of bloom or "flowers."

Certain modifications of these compositions may be referred to. When the vehicle consists of carbontetrachloride alone, there should be included about 20% of a slower drying and higher density modifying agent for which purposes modifying agents of the character set forth above may be employed. Particularly there may be mentioned in this connection Venice turpentine in combination with another modifying liquid which can be used in a larger ratio than the slowly penetrating and drying and very pasty Venice turpentine. The latter should desirably be limited to an amount of 1 to 4% or may be used in combination with about 8 to 16% of an acetate ester, alcohol, or benzyl alcohol, benzyl acetate or benzyl benzoate, or pine oil, or secondary or tertiary butyl acetate, or a mobile pure organic metallic compound, or viscous sirupy solvents.

As indicated above, drying oils and waxes are generally avoided and unnecessary. For some purposes, however, limited amounts of such vegetable drying oils and of saponifiable hard waxes may be employed, particularly where the composition is to be utilized for specialized purposes. When so employed the amount of vegetable drying oil such as tung oil or saponifiable hard wax such as carnauba wax should not exceed the amount of resin present in the composition. Such tung oil or other vegetable drying oil containing compositions are particularly useful for application to cracked coating while the wax containing compositions are more particularly useful for cracked leather furniture.

Compositions containing the higher proportions of resin such as 8% and a modifying agent including a cellulose ester solvent are particularly useful in removing accumulated dirt and grease or perspiration marks from leather furniture and simultaneously to deposit a flexible preservative film of resin. Metallic naphthanates may similarly be used in such compositions.

While as set forth above, compositions for cleaning and polishing purposes may desirably be made from the phenol formaldehyde resins and particularly by the inclusion of the metallic organic compounds of the character described above, polishes can be produced including the metallic organic compounds as the film-forming agent without any inclusion of resins whatsoever, or the inclusion of resins to a very small extent only as from ½ to 1½% of the composition, to give even more greatly improved polishing and cleaning compositions based on such utilization of the metallic organic derivative as the film-forming agent using such material in the ratio of about 4 to 20% of the composition. Exemplifying such material, the following compositions are noted:

Example IV

|  | Parts |
|---|---|
| Oil soluble phenol formaldehyde resin | 1½ |
| One or more pure organic metallic compounds soluble in petroleum | 4 to 6 |
| Naphtha or Stoddard solvent | 92 |

The organic metallic compound may be, for example, equal parts of cobalt and lead naphthenates. The composition makes a fine polish.

An even better polish is obtained when modifying liquids are included which consists of a wider combination of ingredients and especially when there is included a cellulose ester solvent such as an acetic ester as indicated in the following example:

Example V

|  | Parts |
|---|---|
| Resin | 1½ |
| Metallic compounds | 4 to 8 |
| Butyl acetate or ethyl alcohol | 4 to 8 |
| Naphtha or Stoddard solvent | 82 to 100 |

Referring to the organic metallic derivatives, the linoleates are desirably used but the best results are obtained with the naphthenates. The metallic compounds should be dilutable in a petroleum distillate to a clear transparent liquid even in the cold without the necessity of previous solution in turpentine (heretofore required in the prior art), (1) to the smallest concentration, as for example, ¼% for the purpose of merely giving color to the composition, or (2) to concentrations as high as 16 or even 20% to serve as a film-forming agent. Only such a pure organic metallic compound can be used in this way.

The organic metallic derivative employed may be produced in a variety of ways as illustrated by the following. It may be produced by thorough reaction of an inorganic metallic compound of the character desired such as a salt of cobalt, magnesium, manganese, lead, aluminum, etc., particularly a water soluble salt such as the sulphate, acetate, etc., utilizing an excess of liquid fatty acid or reagent for reaction with such metallic salt, the excess of the liquid fatty reagent being substantially beyond that necessary for metathetical reacting proportions and may actually be as much as 20 to 35 times greater in weight than the corresponding metal derivative. The actual proportion of liquid fatty reagent depends on its acidity, the alkalinity of the metal compound, the acid number of the organic reagent, the degree of heat employed, and the hardness of the metal of the compound, that is, whether a hard metal like cobalt or a soft metal like lead. Such mobile metallic compound acts as a solvent for the oil soluble resin, as an auxiliary solvent for the alcohol soluble resin, as a lubricity agent, as a modifier for the petroleum diluent to prevent bloom and as an independent film-forming agent which is better than a solid metallic compound derived from a solid fatty acid like stearic acid or from rosin. Or the desired compound can be produced by a double decomposition as set forth above and the precipitated metal compound subjected to a repetition of treatment. Or reaction may be carried out using naphthenic acid which reacts more effectively and spontaneously with the desired metal ingredient, as for example, lead acetatae, giving reaction in the cold to a pure organic compound particularly useful in polishes for light colored automobiles and furniture. Or the metal compound may be first treated with alkali, as for example, 1 to 3 parts to 15 parts of the metal, and then reacted with the liquid fatty reagent or the alkali may be present during the reaction of the other components. The character of the inorganic acid from which the reacting metal salt was derived requires consideration. The stronger inorganic acids like sulphuric or hydrochloric give compounds which are more acid in character than salts derived from weaker acids such as acetic acid and reduce the alkalinity of the composition. Consequently alkaline reagents may be incorporated to get more complete reaction. For example, 2 to 4 parts of potassium hydroxide or strong ammonia may be added for each part of cobalt sulphate and reacted with 15 to 20 parts of the organic acid followed by washing of the product and then drying. For treatment of lead acetate which is a salt of a softer metal, less alkaline reagent may be employed, thus for each part of lead acetate there may be used 1/15 part of the alkali, enabling conversion into the pure organic derivative by a small excess of the organic reagent. Another example involves treatment of 1 part cobalt acetate with 3/15 part potassium hydroxide and 18 to 20 parts linoleic acid. Naphthenic acid is the most effective reagent to give metallic compounds soluble in petroleum derivatives and forms such derivatives even in the cold. For example, 1 part lead acetate reacted with only 8 parts naphthenic acid in the cold form the desired derivative and such product is nearly colorless and suitable as a polish for light colored automobiles. The pure metallic organic compounds even of colorless lead or zinc, are colored per se and they give a fine color to the polishing compositions even when used in a concentration of merely ¼%.

However produced, the product should be pure and free from contaminating ingredients which lead to difficulties in solubility and other characteristics. These pure organic metallic compounds are soluble to give a fine transparent color, in petroleum hydrocarbon including even the non-saponifiable and non-drying paraffin and mineral oils, such solution being readily produced in the cold, and in varying proportions without the necessity of solvents, such as turpentine or added ingredients like vegetable oils. These liquid organic metallic compounds are referred to as mobile because of their liquidity and they give exceedingly important characteristics to the cleaning and polishing compositions in which they are employed, among which there may be noted that they do not result in any precipitation in the desired composition and thereby produce homogeneous materials which are readily distributed in a uniform manner over the surface to be treated. Because of their homogeneity they are readily packaged for sale in glass containers. They reduce or completely mask the disagreeable odors of the petroleum or turpentine vehicles, particularly when used in the higher proportions referred to, and they modify the petroleum vehicles so that the latter do not exhibit bloom or flowers on surfaces to which they are applied. They are compatible with oil soluble resins and combine with the latter in producing uniform homogeneous compositions even in volatile petroleum vehicles, they dissolve all solid oil soluble resins and modify them so that they are lubricous and freely distributable by a cloth, they enable relatively low cost or low grade oil soluble resins to be employed, they enable the amount of solvent necessary for the resins to be materially reduced because they have a solubilizing effect on the resins, and particularly they act as film-forming agents which produce a very thin light transparent metallic preservative film of very delicate character. These metallic derivatives may be used in the petroleum or chlorinated hydrocarbons without precipitation even with the lead derivatives which usually give precipitation in the presence of chlorinated hydrocarbons. The film produced from the metal derivative does not mask the grain of woods such as mahogany, red wood or oak. Even when used in the highest proportions they produce no sediment and are not affected by light even when exposed in ordinary glass containers. They may be used as a solvent for oil soluble resin to eliminate the necessity for cellulose ester solvents so that the resulting composition is not injurious even to imitation hard wood finishes which are the most sensitive coatings. Used as auxiliary solvents for alcohol soluble resins, they enable the higher ratios of petroleum diluents to be employed.

As an example of such types of compositions, the following is given:

Example VI 8 to 16 parts of one or more mobile pure organic metallic compounds, particularly those soluble directly in volatile petroleum hydrocarbons.

80 parts of a diluting cleaning vehicle consisting of a volatile petroleum hydrocarbon, carbontetrachloride, ethylene dichloride, xylol or turpentine.

5 to 20 parts of a modifying liquid such as an oil containing ester, a cellulose ester solvent, a liquid chlorinated hydrocarbon of higher density than carbontetrachloride, or a combination of such components.

Cleaning and polishing compositions produced in accordance with the present invention are particularly valuable in polishing metal and wood surfaces such as automobiles and household furniture. They are readily applied to the surface to be cleaned and polished and are freely distributable thereon, rapidly, producing a lustrous finish without the need of buffing or rubbing.

A simpler type of cleaner for automobile surfaces which may be readily used for cleaning such surfaces even more thoroughly than by washing may be composed of from 8 to 16 parts of a metallic naphthenate with 84 parts of Stoddard solvent or slow volatile naphtha equal in character to Stoddard solvent.

A simple polish for common wood work may be composed of from 8 to 20% of a metallic naphthenate with 85 parts of paraffin oil. The metallic compound greatly reduces the greasiness of the oil and to some extent gives it drying properties and a lustrous finish.

Cleaners and polishers produced in accordance with the present invention exhibit many noteworthy advantages over prior art types of materials. They are directly applicable as by a cloth and readily dissolve and remove accumulated grease and hardened dirt. They are of unusual economical cost because the lower grades of petroleum naphtha may be utilized and may constitute as indicated as much as 85% of the composition. They are readily made by mixing the stated ingredients without the use of heat to produce homogeneous substantially transparent liquids which are stable even on long standing and do not require agitation or shaking before use. They eliminate fire hazards. They are non-injurious to oil coatings and even on sensitive lacquer films may be readily used so that they are directly suitable for use on automobiles, pianos, radios and other household furniture, and for painted, varnished, and enameled surfaces. They are free from acids, alkalies, soaps, water, abrasive powders, and from any ingredients which give rise to injury to surfaces particularly when used in the proportions herein set forth.

Having thus set forth my invention, I claim:

1. A cleaning and polishing composition suitable for automobiles and furniture, capable of producing a very thin transparent lustrous preservative film reducible by repeated applications with a cloth and thus non-accumulative to a thick layer, said composition comprising from ½ to 5% of an oil-soluble phenol formaldehyde resin and from 1 to 8% of a petroleum soluble metallic salt of a carboxylic acid as film forming components, the film forming components being present in limited proportions sufficient to form a very thin delicate transparent film insufficient of itself to act as a protective film, the remainder of the composition being petroleum hydrocarbons boiling in the range of Stoddard solvent, and up to 25% of a compatible organic volatile liquid solvent for the resin and salt.

2. A composition as set forth in claim 1 which contains said compatible solvent and said solvent boils above the petroleum hydrocarbons.

3. A cleaning and polishing composition comprising from ½ to 5% of an oil-soluble phenol-formaldehyde resin, from 1 to 8% of a petroleum soluble metallic soap, the remainder of the composition being petroleum naphtha, and up to 25% of a compatible organic volatile liquid solvent for the resin and soap.

4. A composition as set forth in claim 3 which contains said compatible solvent and said solvent boils above the petroleum naphtha.

5. A cleaning and polishing composition comprising 1½ parts of oil-soluble phenol-formaldehyde resin, from 4 to 8 parts of petroleum soluble metallic soap, from 4 to 8 parts of butyl acetate, and from 82 to 100 parts of naphtha.

JACOB RATNER.